United States Patent [19]
Glazier

[11] Patent Number: 5,222,817
[45] Date of Patent: Jun. 29, 1993

[54] PRESTRESSED ROLLER BEARING

[76] Inventor: Stephen C. Glazier, 3202 Rowland Pl., NW., Washington, D.C. 20008

[21] Appl. No.: 688,816

[22] Filed: Apr. 22, 1991

[51] Int. Cl.⁵ .......................................... F16C 43/04
[52] U.S. Cl. .................................. 384/559; 384/538; 384/584
[58] Field of Search .............. 384/447, 448, 499, 500, 384/510, 513–515, 517, 519, 537, 538, 556, 559–561, 563, 564, 569–571, 584, 585; 29/898.062, 898.09

[56] References Cited

U.S. PATENT DOCUMENTS

| | | | |
|---|---|---|---|
| 1,048,758 | 12/1912 | Sultemeyer | 29/898.062 |
| 1,247,858 | 11/1917 | Miller | |
| 1,301,843 | 4/1919 | Hegelman | 384/514 X |
| 1,787,214 | 12/1930 | Shafer | |
| 1,811,679 | 6/1931 | Volet | |
| 1,995,838 | 3/1935 | Buckwalter | |
| 2,589,560 | 3/1952 | Lloyd | 384/563 |
| 2,591,622 | 4/1952 | Shoup | 384/563 |
| 2,594,578 | 4/1952 | McNicoll | |
| 2,897,581 | 8/1959 | Cowles et al. | |
| 2,983,029 | 5/1951 | Perin et al. | |
| 2,983,560 | 5/1961 | Pitner | |
| 3,765,071 | 10/1973 | Bowen | |
| 3,816,013 | 6/1974 | Schuhmann | 384/538 X |
| 4,427,241 | 1/1984 | Jatczak | |
| 4,708,498 | 11/1987 | Labedan et al. | |
| 4,732,497 | 3/1988 | Sawa et al. | 384/585 |
| 4,893,948 | 1/1990 | Hoch | 384/551 |

OTHER PUBLICATIONS

American Standard Identification Code for Ball and Roller Bearings Jun. 7, 1960, pp. 7–24, Anti-Friction Bearing Manufacturers Association.

*Primary Examiner*—Thomas R. Hannon
*Attorney, Agent, or Firm*—William McNichol, Jr.

[57] ABSTRACT

A prestressed roller bearing and method of assembly whereby the inner race, plurality of roller elements, and outer first assembled in an unprestressed manner. Then a tapered collar is inserted into the inner race, stretching the inner race to prestress the roller elements. This final assembly can be tested in the factory. Then the bearing is shipped and installed onto a conventional supported shaft outside of the factory, in the manner of an unprestressed bearing without special installation procedures or shafts or equipment. This provides a ready-to-mount prestressed roller bearing, factory tested and standardized, without damage from press-fit assembly of the inner race into the roller elements.

2 Claims, 2 Drawing Sheets

PRESTRESSED ROLLER BEARING

FIELD OF THE INVENTION

The present invention relates to prestressed roller bearings. More specifically, the present invention relates to a new design of prestressed roller bearing that is easily and reliably assembled in the factory in a prestressed manner without damaging the finished surfaces of the rollers or the races. After assembly, the bearing requires no special installation technique on the supported shaft, and can be purchased as a ready-to-mount bearing for a conventional shaft.

BACKGROUND ART OF THE INVENTION

Prestressed roller bearings are known. See Italian Pat. No. 418,088, issued to Steffenini, Feb. 5, 1947, and U.S. Pat. No. 3,765,071, issued to Bowen, Oct. 16, 1973. These bearings are used to support a rotating shaft upon or within a non-rotating member, in a frictionless manner.

Common problems with conventional prestressed roller bearings are: (1) finding a method of assembly and prestressing that does not damage the rollers and races, some of which parts have polished high precision surfaces, and (2) special talent or training is required on the part of the installation mechanic in the field that installs such bearings on the supported shaft.

Prestressed roller bearings are commonly assembled by placing the rollers inside the outer race, and then using extreme force to press the inner race within the rollers. This force fit of the inner race prestresses the rollers but also causes an axial sliding of the surfaces of the inner race across the surfaces of the rollers. This is destructive to the rollers and races at the point of contact. This yields a bearing that has been weakened in an unknown and individually varying, non-standard manner. To a certain extent, this destruction can be mitigated by rotating the inner race as it is pressed between the rollers. However, this is a difficult and unpredictable technique and also causes scarring of the surfaces. See U.S. Pat. No. 2,594,578, issued to McNicholl, Apr. 29, 1952.

An alternative method of assembly of prestressed roller bearings is to first assemble the bearing in an unprestressed manner. The bearing is then installed on the supported shaft by pressing it on a tapered end portion of the shaft. By forcing the bearing down over the tapered shaft, the expanding diameter of the tapered shaft stretches the diameter and circumference of the inner race to the point that it prestresses the rollers. The problem with this method is that it requires a special tapered shaft and special training and skill on the part of the individual who installs the bearing on the shaft. If the bearing is pressed too far on the shaft then the rollers are overly prestressed. If the bearing is not pressed farther enough down the shaft then the rollers are not adequately prestressed. The adequacy of the prestressing cannot be quality controlled in the factory setting, since the prestressing does not take place until the installation on the supported shaft in the field.

An effort has been made to facilitate this method of prestressing-by-installation on the shaft. See U.S. Pat. No. 4,893,948, issued to Hoch, Jan. 16, 1990. In Hoch, an assembled and as yet unprestressed bearing with an inner race with a conical bore is mounted without prestressing on a bearing seat on the supported shaft. The bearing seat is attached to the supported shaft and has a conical clamping sleeve. After installation, the clamping sleeve on the shaft is forced a calibrated distance into the inner race of the bearing, between the supported shaft and the inner race of the bearing. In this manner, the inner race of the bearing is stretched, thereby prestressing the rollers. This is a method of prestressing the rollers during or after installation upon the shaft. Again, this method requires special training on the part of the installing individual, and takes place at the point of installation, outside of the manufacturing facility for the bearing and outside of the quality control of such facility.

An alternative approach of prestressing upon installation is found in U.S. Pat. No. 4,708,498, issued to Labedan and Merle, Nov. 24, 1987. Here the bearing is manufactured in two halves that are unprestressed. At the time of installation, the two halves are assembled on the supported shaft by compression within the cavity of a outer mount that is installed around the two halves. Again this provides for prestressing upon installation on the shaft, outside of the manufacturing facility. It requires special training on the part of the installer and is beyond the quality control of the factory. Furthermore, only certain bearing situations permit this half-and-half sort of bearing, and the design limits performance of the bearing after installation.

It is an object of the present invention to provide a prestressed roller bearing that is manufactured and prestressed within its manufacturing facility, and within the quality control of that facility.

It is a further object of the present invention to manufacturer such prestressed roller bearing and assemble it in a manner that does not provide for pressured axial sliding of the surfaces of the rollers over the surfaces of the races, so as to scar and damage the parts.

It is a further object of the invention to provide for a prestressed roller bearing that can be installed on a normal supported shaft by the normal methods of installing an unprestressed roller bearing, without special training or skill on any other part of the installing individual.

SUMMARY OF THE INVENTION

The present invention is a prestressed roller bearing that consists of an outer circular race, an inner circular race, a plurality of roller elements, and a collar that is inserted within the inner race. The outer surface of the collar is tapered and the inner surface of the collar is cylindrical. The inner surface of the inner race is tapered at an angle coinciding with the angle of taper of the outer surface of the collar. The dimensions of the two races and the roller elements are such that the inner race, all of the plurality of roller elements, and the outer race may be assembled in an unprestressed manner, that is with small clearances between these parts when assembled.

The bearing is then prestressed by the insertion of the tapered collar within the inner race. The inner race, after it is assembled inside the roller elements in the outer race, is pressed over the outer surface of the tapered collar. By such pressing, the tapered collar stretches the inner race, expanding the diameter and circumference of the inner race, thereby prestressing the roller elements.

When the inner race, the roller elements, and the outer race are assembled, they are assembled without prestressing, with clearances conventional to unprestressed roller bearings. This is done without pressure and without any pressed axial sliding of the surfaces of the inner race or the surfaces of the rollers. Hence, no scarring of the surfaces is experienced.

When the assembled inner race is pressed over the tapered collar, the only pressure and scarring between the parts of the bearing are between the outer surface of the collar and the inner surface of the inner race. The roller elements and the inner and outer races are not axially slid over each other during this final prestressing assembly onto the tapered collar. The tapered collar may have a lip on the edge of its outer surface, at the end with the longest diameter, to stop the further insertion of the inner race. The dimensions of the parts of the bearing may be predesigned so that the exact required amount of prestressing of the roller elements are obtained when the inner race is fully pressed onto the tapered collar and stopped by contact with the lip on the collar.

After assembly, the inner race and the tapered collar do not move in relation to each other. During the last prestressing step of assembly there is considerable pressure, friction, and scarring between the inner race and the tapered collar. However, during the use of the bearing, these parts are not intended to move in relation to each other, and are intended to be fixed in relationship to each other. Therefore, scarring between these two surfaces is not material to the functioning of the bearing.

The result is a prestressed roller bearing that is completely assembled and prestressed in the factory and is subject to quality control in the factory. It then may be shipped to its users and installed on a conventional cylindrical shaft to be supported by the bearing, in the manner of a conventional unprestressed bearing.

DETAILED DESCRIPTION OF THE INVENTION

Figure 1:
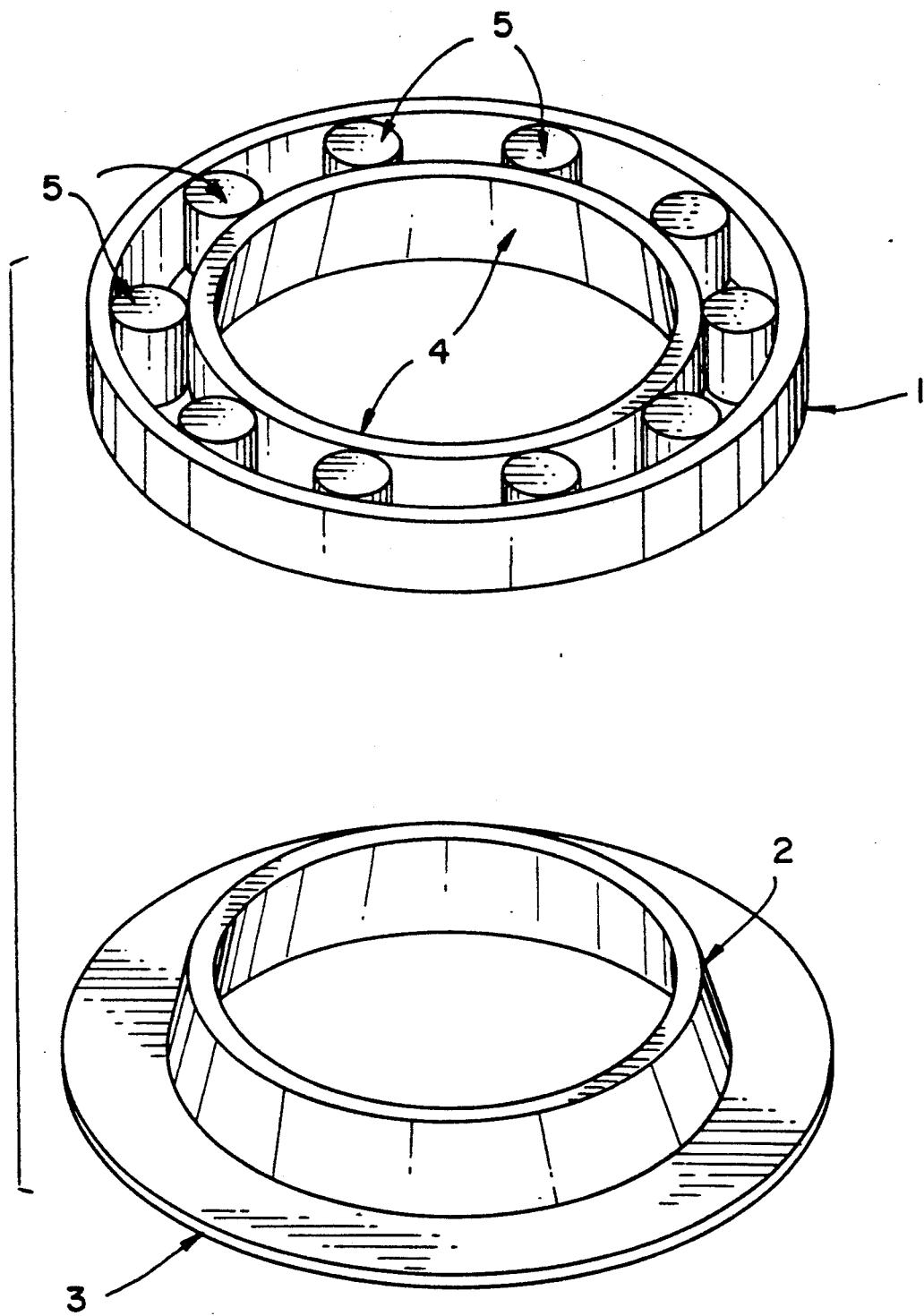
FIG. 1 shows a partially exploded view of the invention.

FIG. 1 shows the outer race 1, the plurality roller elements 5, all assembled around the inner race 4. Also shown is the tapered collar 2 with the collar lip 3.

Figure 2:
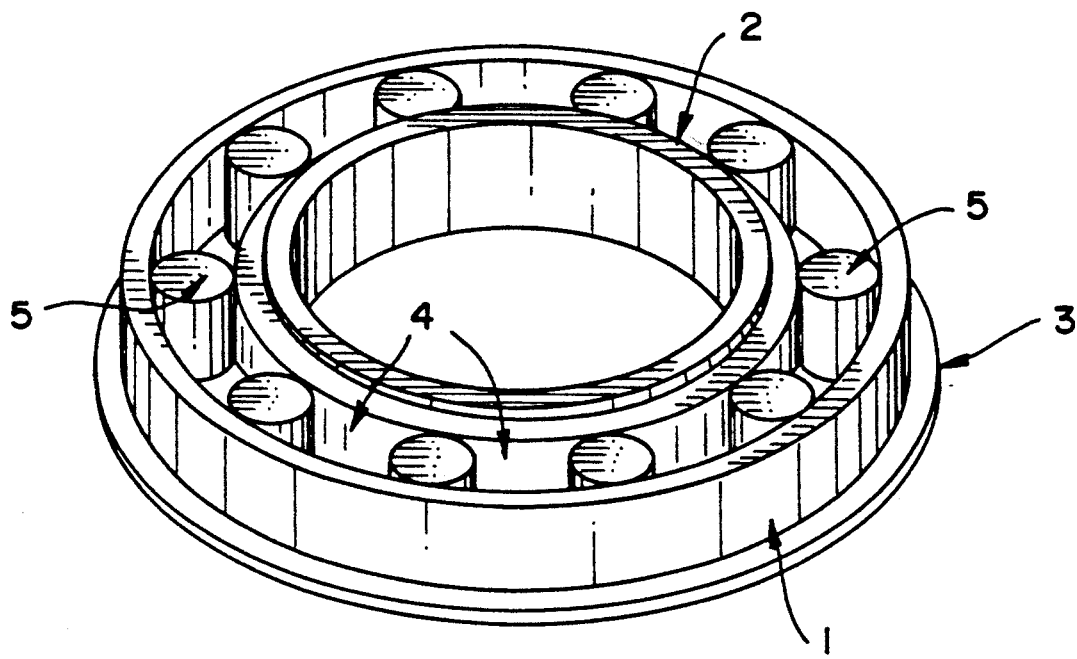
FIG. 2 shows an assembled perspective view of the invention.

FIG. 2 shows the outer race 1 assembled with the plurality of roller elements 5, the inner race 4, and the tapered collar 2, with a collar lip 3.

Figure 3:
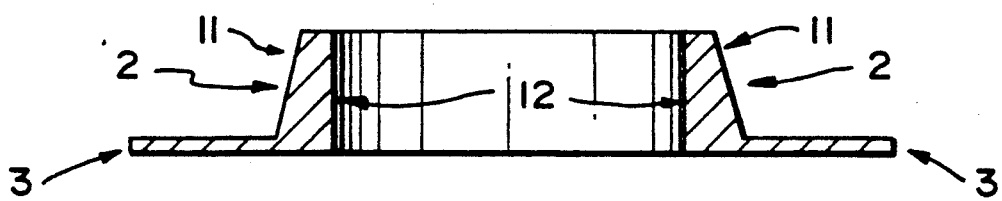
FIG. 3 shows a cross-sectional view of the tapered collar.

FIG. 3 shows a cross-sectional view of the tapered collar 2, with the collar lip 3. The tapered outer surface 11 of the tapered collar 2 is shown. The cylindrical inner surface 12 of the tapered collar 2 is also shown.

Although the above description discusses prestressed roller bearings, it is applicable to all prestressed bearings regardless of the nature of the roller element. For example, it may apply to prestressed bearings with solid cylindrical roller bearings, hollow cylindrical roller bearings, tapered needle bearings (whether hollow or solid), or ball bearings (whether hollow or solid). Furthermore, the bearings can be made of any of a variety of materials, including for example, metals, metal alloys, ceramics, plastics, glasses, composite materials, and laminates. Furthermore, an outer tapered collar may be used, instead of an inner tapered collar; that is, the tapered collar may have a tapered inner bore, and a cylindrical outer surface, and be inserted over the outer race (with a tapered outer surface) to compress the outer race and thereby prestress the roller elements before installation. Also, such an outer collar can be used with an inner collar (as described in detail herein) on the same bearing. Furthermore, the inner surface of the inner collar, which contacts the supported shaft, may have any of the conventionally used bearing inner surface configurations for contact with the supported shaft, such as smooth cylindrical, ribbed, tapped, slightly tapered, threaded, grooved, or splined. Furthermore, different bearing configurations may be used, such as double rows of roller elements, multiple rows of roller elements, or roller elements and races for both radial and axial thrust loads. Furthermore, the bearing and method of assembly described herein can also be used to apply a predetermined radial tensioning force to the inner race to stretch it to achieve optimum clearances and play between the elements of a precision bearing, but short of prestressing the roller elements. (If the inner race is expanded a bit by a small collar, then the clearances between the roller elements and the races are reduced but not eliminated. If, instead, the inner race is expanded more by a larger collar, then these clearances are reduced to zero. If, instead, the inner race is expanded beyond this zero point by an even larger collar, then the roller elements are compressed between the inner and outer races and are thereby prestressed as described in detail herein.) All these variations and others are equivalent to the claimed invention.

The embodiments illustrated and discussed herein are intended only to teach those skilled in the art the best way known by the inventor to make and use the invention. Nothing in the specification should be considered as limiting the scope of the present invention. Any changes could be made by those skilled in the art to produce equivalent devices without departing from the invention. The present invention should only be limited by the following claims and their legal equivalents.

I claim:

1. A pre-stressed roller bearing comprising:
   a. an outer circular race;
   b. an inner circular race with a tapered inner surface;
   c. a plurality of roller elements; and
   d. a tapered collar with a tapered outer surface, tapered at the same angle as the angle of taper of the inner surface of the inner race, and a cylindrical inner surface,
   e. the inner diameter of the unassembled outer circular race is greater than the sum of the outer diameter of the unassembled inner circular race plus twice the outer diameter of an unassembled roller element, and such inner diameter is greater than such sum by a first amount of small clearance, such that the assembly of the plurality of roller elements, the inner race, and the outer race, without the collar, is not pre-stressed, and
   f. the outer diameter of the unassembled tapered collar at at least one point exceeds the inner diameter of the inner circular race at at least one point, and such excess is equal to a second amount, and the second amount is greater than the first amount of small clearance, such that the assembly of the plurality of roller elements, the inner race, the outer race, and the tapered collar pushed into the inner race, is pre-stressed by the tapered collar stretching the inner race.

2. The prestressed roller bearing of claim 1, further comprising, a flange on the outer surface of the tapered collar at the end with the largest diameter of such tapered outer surface.

* * * * *